United States Patent
Kim et al.

(10) Patent No.: US 10,420,021 B2
(45) Date of Patent: Sep. 17, 2019

(54) METHOD AND USER EQUIPMENT FOR SELECTING NETWORK AND ROUTING TRAFFIC

(71) Applicant: LG ELECTRONICS INC., Seoul (KR)

(72) Inventors: Jaehyun Kim, Seoul (KR); Jaewook Lee, Seoul (KR); Taehun Kim, Seoul (KR); Hyunsook Kim, Seoul (KR); Laeyoung Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 15/542,883

(22) PCT Filed: Feb. 3, 2016

(86) PCT No.: PCT/KR2016/001198
§ 371 (c)(1),
(2) Date: Jul. 11, 2017

(87) PCT Pub. No.: WO2016/126109
PCT Pub. Date: Aug. 11, 2016

(65) Prior Publication Data
US 2017/0374610 A1    Dec. 28, 2017

Related U.S. Application Data

(60) Provisional application No. 62/111,119, filed on Feb. 3, 2015.

(51) Int. Cl.
*H04W 48/18* (2009.01)
*H04W 28/08* (2009.01)
(Continued)

(52) U.S. Cl.
CPC .......... *H04W 48/18* (2013.01); *H04W 28/08* (2013.01); *H04W 8/08* (2013.01); *H04W 8/18* (2013.01);
(Continued)

(58) Field of Classification Search
CPC ... H04W 48/18; H04W 28/02; H04W 84/042; H04W 84/12; H04W 8/08; H04W 36/14;
(Continued)

(56) References Cited

U.S. PATENT DOCUMENTS

2014/0079022 A1    3/2014   Wang et al.
2014/0233386 A1    8/2014   Jamadagni et al.
(Continued)

FOREIGN PATENT DOCUMENTS

WO    2014000808    1/2014
WO    2014119968    8/2014
WO    2014137169    9/2014

OTHER PUBLICATIONS

PCT International Application No. PCT/KR2016/001198, International Search Report dated May 13, 2016, 2 pages.

*Primary Examiner* — Charles C Jiang
*Assistant Examiner* — Rosene Clark
(74) *Attorney, Agent, or Firm* — Lee Hong Degerman Kang & Waimey

(57) ABSTRACT

Provided in one disclosure of the present specification is a method selecting a network and routing traffic by a user equipment (UE). The method may comprise a step of receiving, from a base station, radio access network (RAN) support information, wherein the RAN support information may include RAN support parameters and a timer value. The method comprises the steps of: receiving, from an upper layer, an evaluation request; evaluating the RAN support parameters according to the request from the upper layer;
(Continued)

delivering, to the upper layer, an indication which indicates a detour to wireless local area network (WLAN) access and a detour to 3GPP access according to the result of the evaluation, and/or an indication which indicates maintaining current access; and performing feedback to the step of evaluating when the timer expires.

14 Claims, 15 Drawing Sheets

(51) Int. Cl.
| | |
|---|---|
| H04W 76/27 | (2018.01) |
| H04W 8/08 | (2009.01) |
| H04W 84/04 | (2009.01) |
| H04W 84/12 | (2009.01) |
| H04W 8/18 | (2009.01) |
| H04W 36/14 | (2009.01) |
| H04W 48/12 | (2009.01) |
| H04W 88/06 | (2009.01) |

(52) U.S. Cl.
CPC ............ *H04W 36/14* (2013.01); *H04W 48/12* (2013.01); *H04W 76/27* (2018.02); *H04W 84/042* (2013.01); *H04W 84/12* (2013.01); *H04W 88/06* (2013.01)

(58) Field of Classification Search
CPC ... H04W 48/12; H04W 76/046; H04W 76/27; H04W 88/06; H04W 8/18
See application file for complete search history.

(56) References Cited

U.S. PATENT DOCUMENTS

| | | | | |
|---|---|---|---|---|
| 2014/0295843 | A1* | 10/2014 | Van Der Velde | ..... H04W 36/22 455/436 |
| 2016/0219478 | A1* | 7/2016 | Huang-Fu | ......... H04W 36/0083 |
| 2016/0219480 | A1* | 7/2016 | Roeland | ............ H04W 28/0268 |
| 2017/0164419 | A1* | 6/2017 | Kim | .......................... H04L 5/00 |
| 2017/0257822 | A1* | 9/2017 | Harris | ................... H04W 48/12 |
| 2018/0020385 | A1* | 1/2018 | Laselva | ................. H04W 36/22 |

* cited by examiner

METHOD AND USER EQUIPMENT FOR SELECTING NETWORK AND ROUTING TRAFFIC

CROSS-REFERENCE TO RELATED APPLICATIONS

This application is the National Stage filing under 35 U.S.C. 371 of International Application No. PCT/KR2016/001198, filed on Feb. 3, 2016, which claims the benefit of U.S. Provisional Application No. 62/111,119, filed on Feb. 3, 2015, the contents of which are all hereby incorporated by reference herein in their entirety.

BACKGROUND OF THE INVENTION

Field of the Invention

The present invention relates to mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
| --- | --- |
| S1-MME | A reference point for a control plane protocol between the E-UTRAN and the MME |

TABLE 1-continued

| Reference point | Description |
| --- | --- |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis.

Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 4b.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, with an explosive increase in data in recent years, a 3GPP access of a mobile communication operator is becoming more congested. As a way of solving this problem, there is an attempt to offload data of a user equipment (UE) through a WLAN which is a non-3GPP access. Hereinafter, an architecture for connecting the WLAN to an EPC is described.

FIG. 6a and FIG. 6b illustrate an architecture for connecting a WLAN to an EPC.

FIG. 6a illustrates an architecture in which a WLAN is connected to a P-GW through an S2a interface. As can be seen with reference to FIG. 6a, a WLAN access network (in particular, it is a trusted WLAN access network since the S2a interface is an interface for connecting a trusted non-3GPP access to the EPC) is connected to the P-GW through the S2a interface. The content disclosed in TS 23.402 is incorporated herein by reference for an architecture for a trusted WLAN access network (TWAN).

FIG. 6b illustrates an architecture in which a WLAN is connected to a P-GW through an S2b interface. As can be seen with reference to FIG. 6b, a WLAN access network (in particular, it is an untrusted WLAN access network since the S2b interface is an interface for connecting an untrusted non-3GPP access to the EPC) is connected to the P-GW through an evolved packet data gateway (ePDG) connected to the P-GW through the S2b interface.

Hereinafter, a trusted WLAN and an untrusted WLAN may be both referred to as a WLAN.

Meanwhile, with a trend for offloading data of a UE not through a 3GPP access of an operator but through a WLAN which is a non-3GPP access, a technology such as IP flow mobility and seamless offload (IFOM), multi access PDN connectivity (MAPCON), or the like has been proposed to support a multiple radio access. The MAPCON technology is a technology of transmitting data by using a 3GPP access and a Wi-Fi access through respective PDN connections. The IFOM technology is a technology of transmitting data by aggregating the 3GPP access and the Wi-Fi access to one PDN or P-GW.

FIG. 7a is an exemplary diagram of the IFOM technology.

Referring to FIG. 7a, the IFOM technology is to provide the same PDN connection through several pieces of different access. Such IFOM technology provides seamless offloading onto a WLAN.

Furthermore, the IFOM technology provides the transfer of IP flows having the same one PDN connection from one access to the other access.

FIG. 7b is an exemplary diagram of the MAPCON technology.

As can be seen with reference to FIG. 7b, the MAPCON technology is to connect several PDN connections, easily, IP flows to other APNs through another access system.

In accordance with such MAPCON technology, the UE 10 can generate a new PDN connection on access that has not been used before. Alternatively, the UE 10 can generate a new PDN connection in one of several pieces of access that were used before. Alternatively, the UE 10 may transfer some of or all PDN connections to another access.

As described above, with the help of the technologies capable of offloading the traffic of UE onto a WLAN, the congestion of the core network of a mobile communication service provider can be reduced.

The provider provides a policy to the UE in order to divert the traffic onto a general data communication network and the UE may divert data thereof onto the wireless LAN according to the policy.

In order to provision the policy the UE, a 3GPP based access network discovery and selection function (ANDSF) is enhanced to provide a policy associated with the wireless LAN.

FIGS. 8a and 8b Show Network Control Entities for Selecting an Access Network.

As can be seen with reference to FIG. 8a, the ANDSF may be present in the home network (Home Public Land Mobile Network (hereinafter called 'HPLMN')) of the UE 10. Furthermore, as can be seen with reference to FIG. 8b, the ANDSF may also be present in the Visited Public Land Mobile Network (hereinafter called 'VPLMN') of the UE 10. When the ANDSF is present in a home network as described above, it may be called an H-ANDSF 61. When the ANDSF is present in a visited network, it may be called a V-ANDSF 62. Hereinafter, the ANDSF 60 generally refers to the H-ANDSF 61 or the V-ANDSF 62.

The ANDSF can provide information about an inter-system movement policy, information for access network search, and information about inter-system routing, for example, a routing rule.

The aforementioned IFOM is performed by the UE's initiative decision and uses DSMIP (Dual Stack Mobile IP), a host-based mobility protocol.

However, a series of processes for offloading the user's traffic via WLAN may not be performed smoothly due to a technical issue between the AS layer and the NAS layer inside the UE.

SUMMARY OF THE INVENTION

Accordingly, an object of the present invention is to present a method that can solve the aforementioned problem.

To achieve the technical object described above, one disclosure of the present document proposes a method for offloading a PDN connection in an efficient manner.

More specifically, one disclosure of the present document provides a method for a UE to perform network selection and traffic routing. The method may include receiving RAN (Radio Access Network) assistance information from an eNB. Here, the RAN assistance information may include a RAN assistance parameter and timer values. The method may comprise receiving an evaluation request from an upper layer; evaluating the RAN assistance parameter according to the request from the upper layer; transmitting one of an indication indicating offloading to WLAN (Wireless Local Area Network) access, indication indicating offloading to 3GPP access, and indication commanding to maintain current access to the upper layer according to the evaluation result; and if the timer expires, returning to the evaluating.

The RAN assistance information is expressed by WLAN-OffloadConfig and may be received through a System Information Block (SIB) or Radio Resource Control (RRC) message.

The RAN assistance parameter may include one or more of a 3GPP access threshold value, WLAN access threshold value, and OPI (Offload Preference Indication) value.

The method may further comprise activating the timer when any one of the indications is transmitted to the upper layer.

The timer may be stopped upon receiving a request from the upper layer and may be resumed when any one of the indications is transmitted to the upper layer according to the evaluation result.

The method may further comprise transmitting to the upper layer the same indication transmitted before or an indication commanding to maintain current access if a previous evaluation result is the same as an evaluation result performed again by returning to the evaluating after the timer is expired.

The receiving an evaluation request from the upper layer may comprise the upper layer's receiving a message including an indication for WLAN offloading from an MME (Mobility Management Entity) and the upper layer's transmitting an evaluation result.

Meanwhile, one disclosure of the present document may provide a UE performing network selection and traffic routing. The UE may comprise a transceiver; and a processor controlling the transceiver. The processor comprises an AS (Access Stratum) layer and an upper layer and controls the AS layer to perform the following procedure. The procedure may comprise receiving RAN (Radio Access Network) assistance information from an eNB. Here, the RAN assistance information may include a RAN assistance parameter and timer values. The procedure may comprise receiving an evaluation request from the upper layer; evaluating the RAN assistance parameter according to the request from the upper layer; transmitting one of an indication indicating offloading to WLAN (Wireless Local Area Network) access, indication indicating offloading to 3GPP access, and indication commanding to maintain current access to the upper layer according to the evaluation result; and if the timer expires, returning to the evaluating.

According to the disclosure of the present document, the technical problem in the prior art may be solved.

More specifically, according to the disclosure of the present invention, in case a UE of the 3GPP GSM/UMTS/EPS system selects a cellular access network and WLAN access network for access network selection or data traffic routing, the UE selects either of the networks by utilizing the policy provided by an ANDSF or RAN (namely an eNB) more efficiently, performing routing of data traffic according to the selection, thereby preventing network overload, increasing data transmission efficiency, and improving a user experience.

DESCRIPTION OF EXEMPLARY EMBODIMENTS

Figure 1:
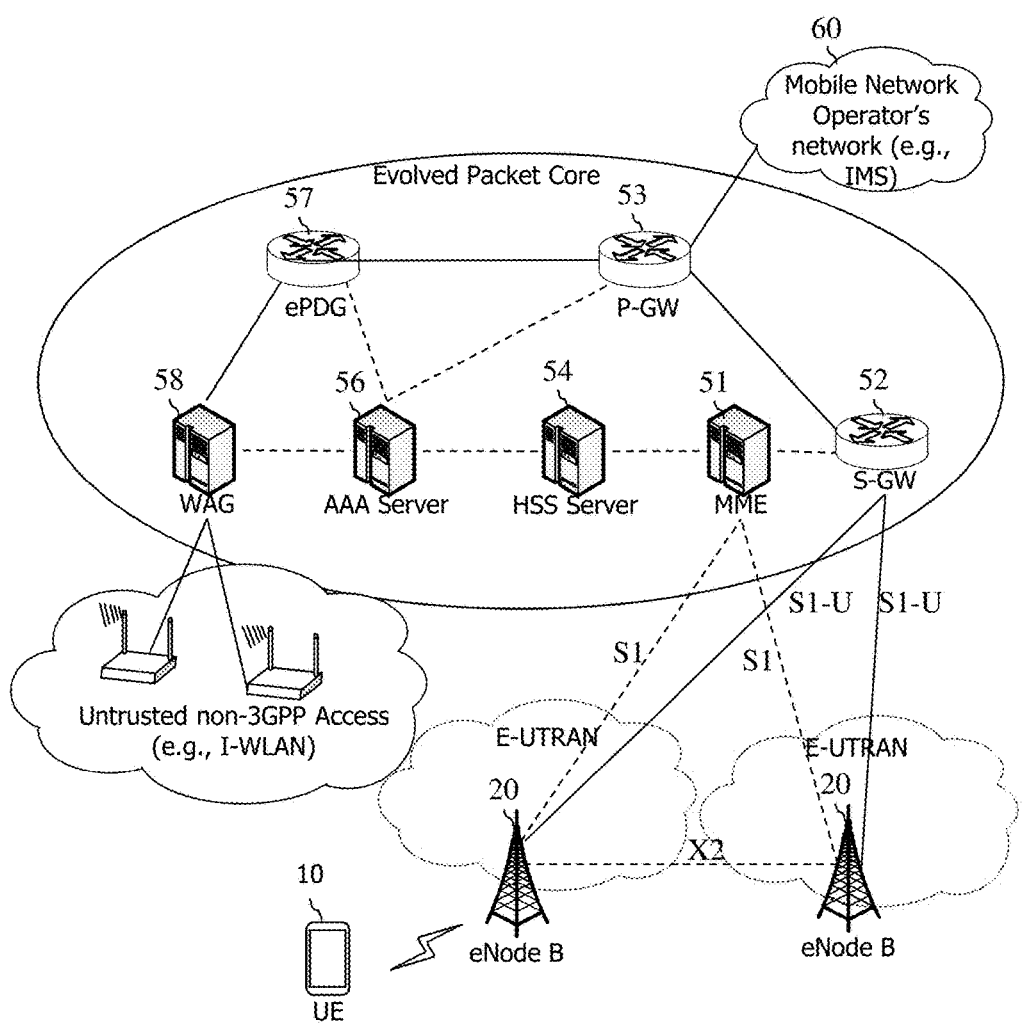
FIG. 1 is a structural diagram of an evolved mobile communication network.
Figure 2:
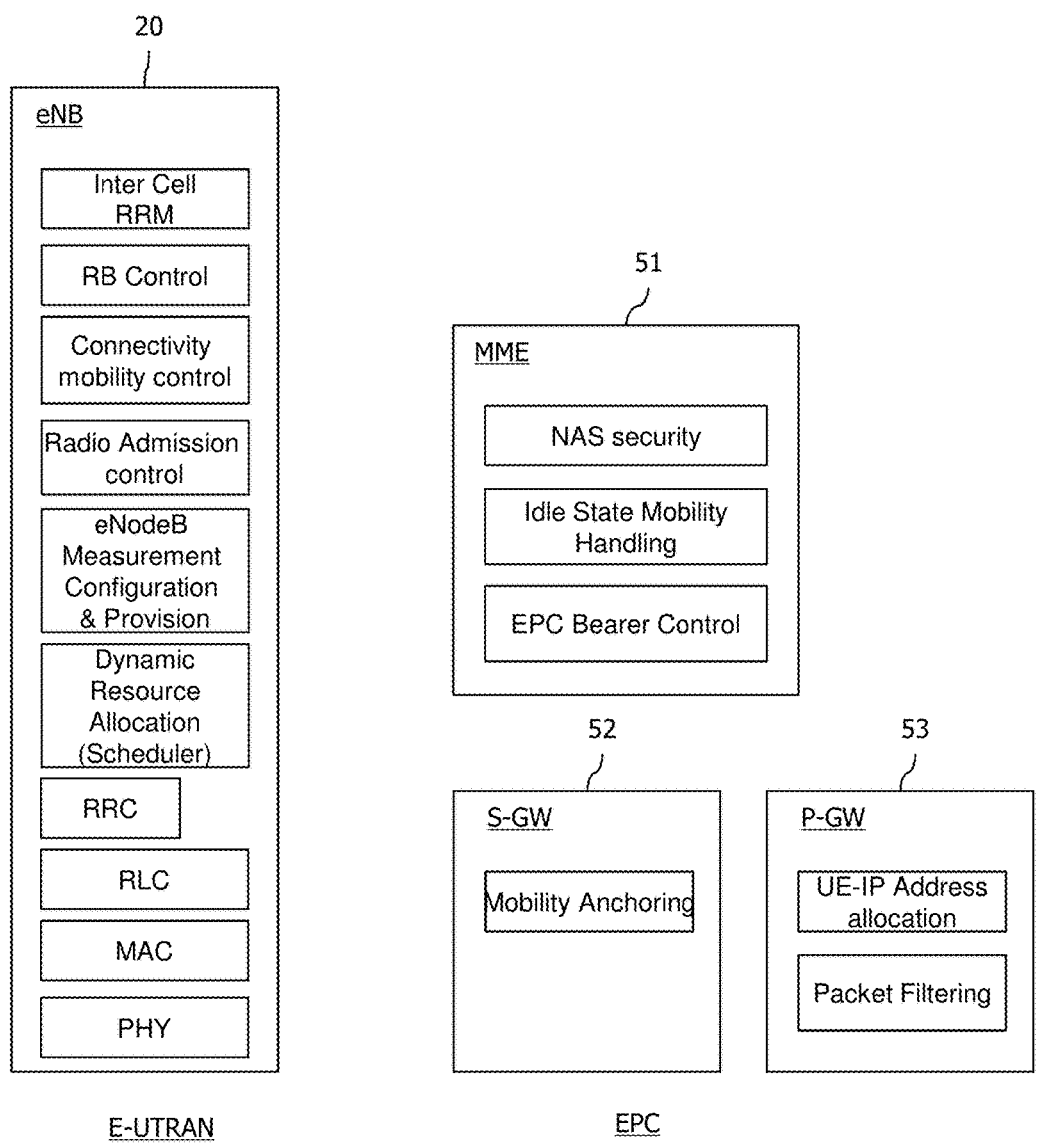
FIG. 2 is an exemplary diagram illustrating architectures of a general E-UTRAN and a general EPC.
Figure 3:
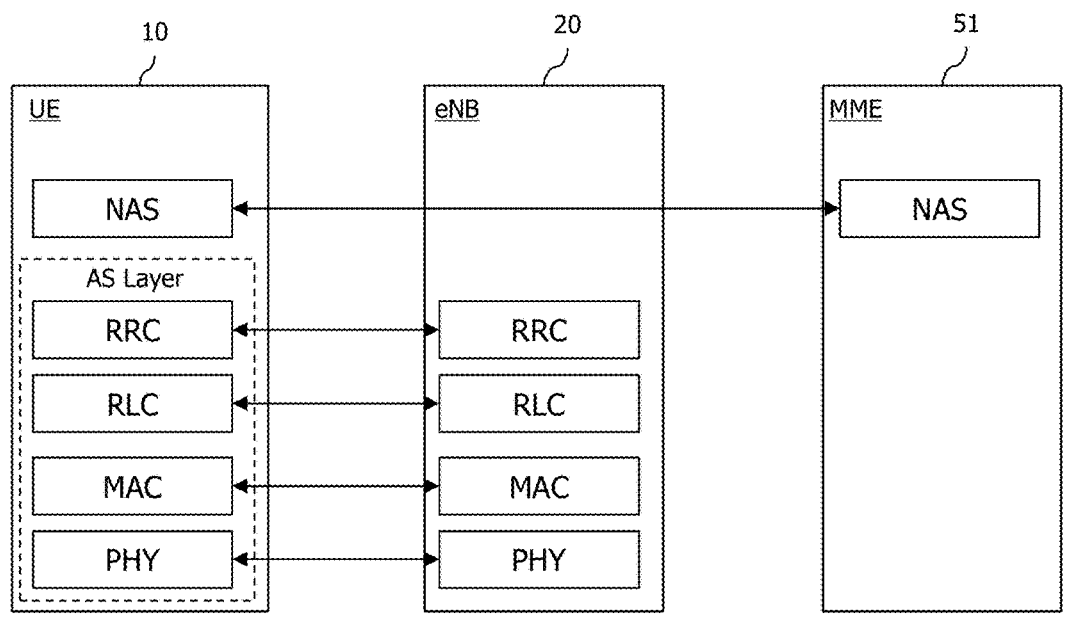
FIG. 3 is an exemplary diagram illustrating a structure of a radio interface protocol on a control plane between UE and eNodeB.
Figure 4:
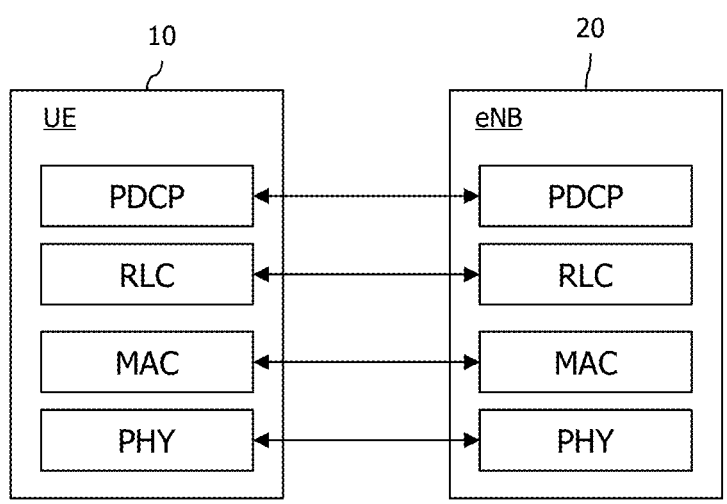
FIG. 4 is another exemplary diagram illustrating a structure of a radio interface protocol on a user plane between the UE and a base station.
Figure 5A:
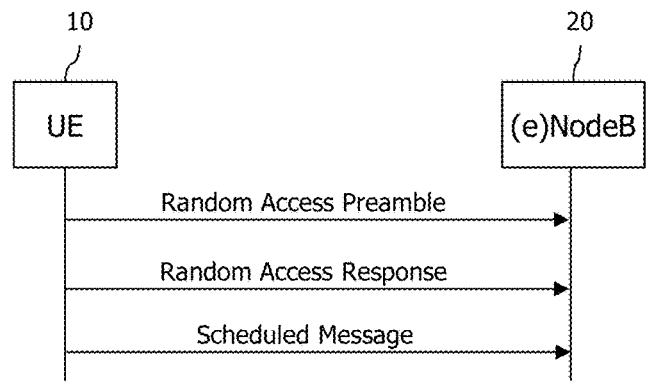
FIG. 5a is a flowchart illustrating a random access process in 3GPP LTE.
Figure 5B:
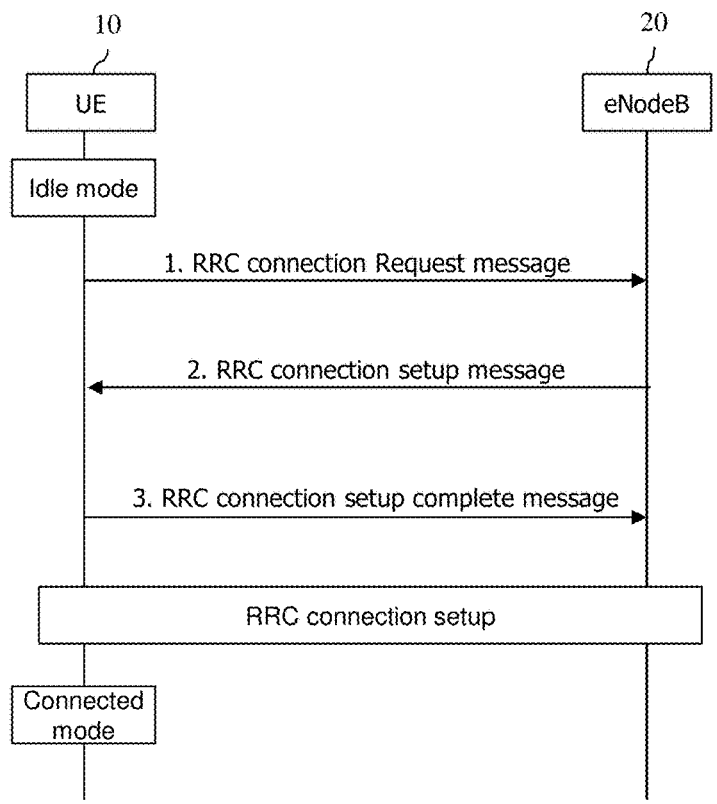
FIG. 5b illustrates a connection process in a radio resource control (RRC) layer.
Figure 6A:
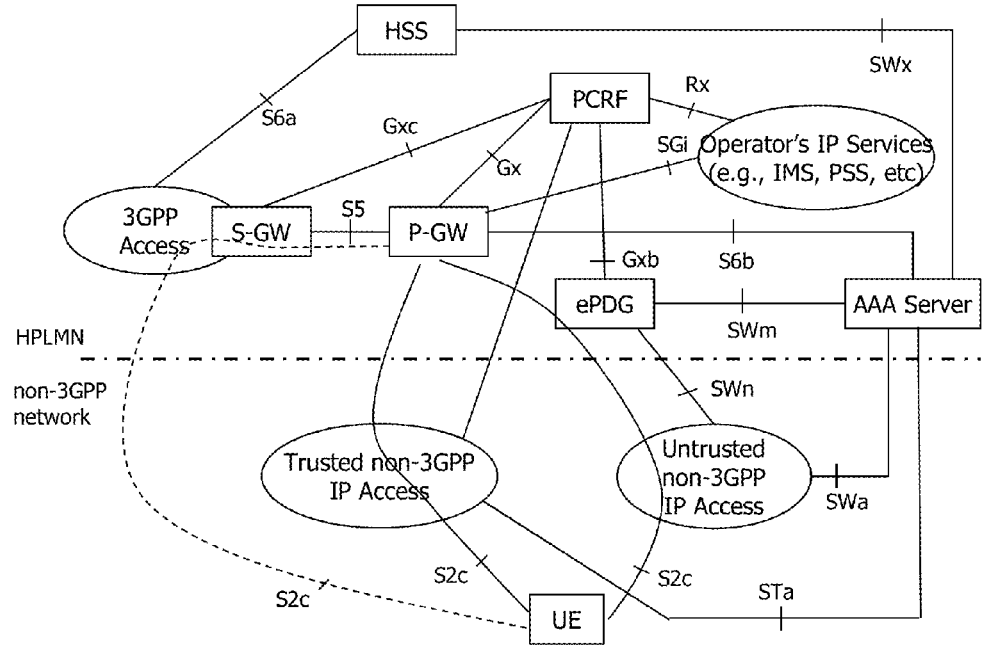
FIG. 6a and FIG. 6b illustrate an architecture for connecting a WLAN to an EPC.
Figure 6B:
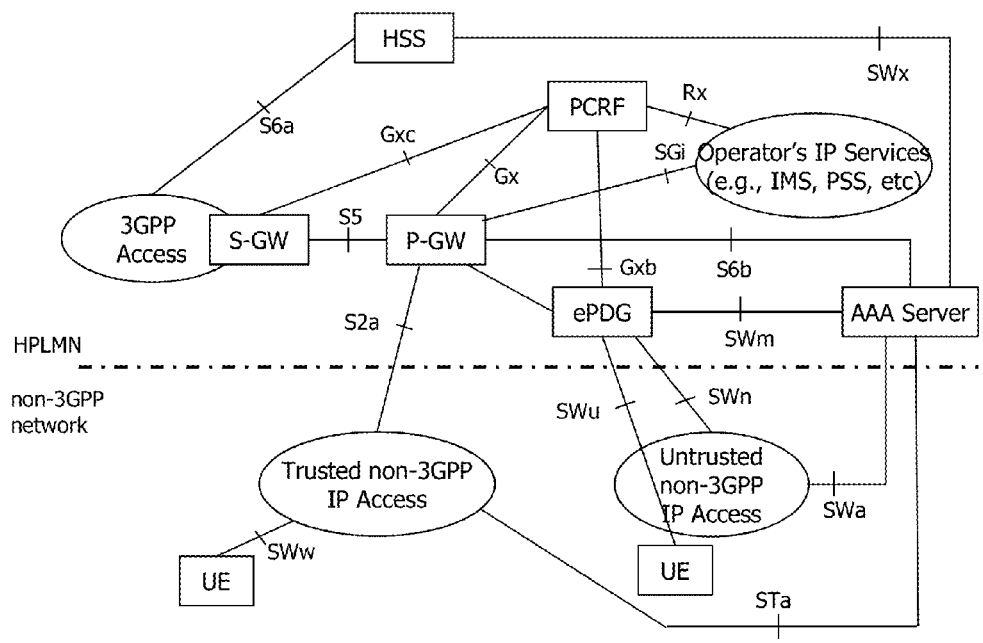
Figure 7A:
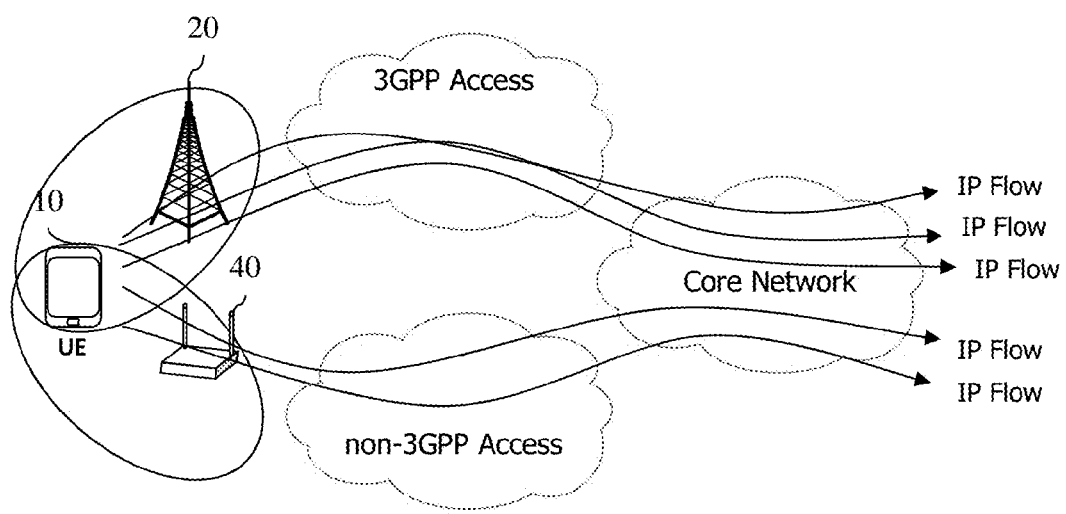
FIG. 7a is an exemplary diagram of the IFOM technology.
Figure 7B:
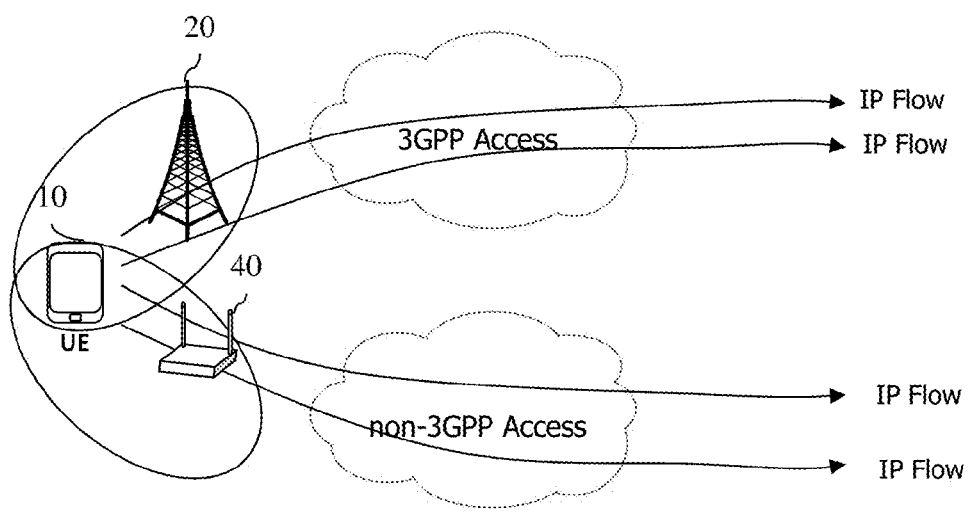
FIG. 7b is an examplary diagram of the MAPCON technology.
Figure 8A:
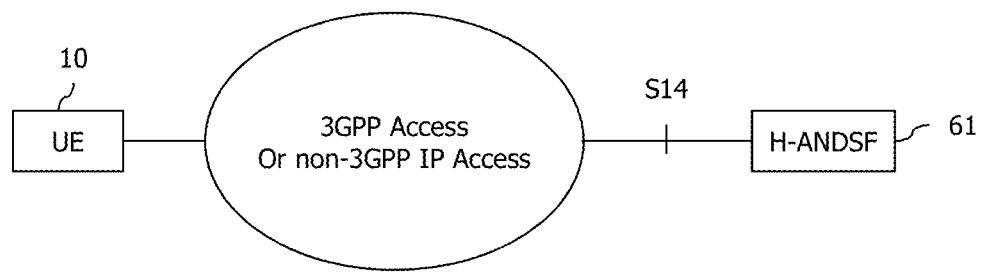
FIG. 8a and FIG. 8b illustrate network control entities for selecting an access network.
Figure 8B:
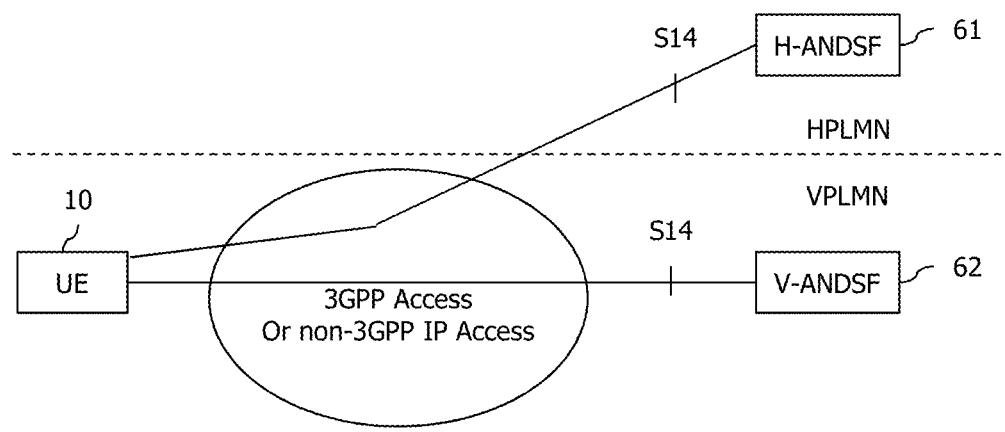

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN is an abbreviation of a GSM EDGE Radio Access Network, and it refers to a radio access section that connects a core network and UE by GSM/EDGE.

A UTRAN is an abbreviation of a Universal Terrestrial Radio Access Network, and it refers to a radio access section that connects the core network of the 3rd generation mobile communication and UE.

An E-UTRAN is an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE or an MS is an abbreviation of User Equipment or a Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF) is a node of an EPS network which performs different QoS for each service flow and a policy decision for dynamically applying a charging policy.

An Access Point Name (APN) is the name of an access point that is managed in a network and provides to UE. That is, an APN is a character string that denotes or identifies a PDN. Requested service or a network (PDN) is accessed via a P-GW. An APN is a name (character string, e.g., 'internet.mnc012.mcc345.gprs') previously defined within a network so that the P-GW can be searched for.

A Tunnel Endpoint Identifier (TEID) is an end point ID of a tunnel set up between nodes within a network and is set in each section as a bearer unit of each terminal.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

A Non-Access-Stratum (NAS) is a higher stratum of a control plane between UE and an MME. The NAS supports mobility management and session management between UE and a network, IP address maintenance, and so on.

RAT is an abbreviation of Radio Access Technology, and it means a GERAN, a UTRAN, or an E-UTRAN.

Local Operating Environment Information: This is a set of implementation specific parameters which describe the local environment in which the UE is operating.

Presence Reporting Area: This is an area defined to report the presence of a UE in a 3GPP packet domain for the reasons of policy control and/or accounting or the like. In case of E-UTRAN, the presence reporting area consists of adjacent or not-adjacent tracking areas or a set of eNodeBs and/or cells. There are two types of presence reporting areas. One is a UE-dedicated presence reporting area, and the other is a presence reporting area predetermined by a core network.

ANDSF (Access Network Discovery and Selection Function): This is one of network entities for providing a policy for discovering and selecting an access that can be used by a UE on an operator basis.

ISRP (Inter-System Routing Policy): This is a rule defined by the operator to indicate which one will be used by the UE for routing of IP traffic among several radio access interfaces. The ISRP may include three types of rules as follows, as a policy for defining an access network preferred (i.e., having a high priority) or restricted to route/steer a packet service (or an IP flow or IP traffic or applications). That is, the ISRP may be divided into an IP flow mobility (IFOM) rule, a multi access PDN connectivity (MAPCON) rule, and a non-seamless WLAN offload (NSWO) rule as follows.

IFOM (IP Flow Mobility) rule: This rule is in regards to a list in which access technologies/access networks to be used by the UE are arranged according to a priority, when traffic matched to a specific IP traffic filter can be routed on a specific APN or on any APN. Further, this rule may designate for which radio access the traffic matched to the specific IP traffic filter is limited on the specific APN or on the any APN.

MAPCON (Multi Access PDN Connectivity) rule: This rule is a list in which the access technologies/access networks to be used by the UE are arranged according to the priority when a PDN connection for the specific APN can be routed. Further, this rule may designate for which radio access a PDN connection to a specific APN will be limited.

NSWO (Non-seamless WLAN offload) rule: This rule designates whether certain traffic will be offloaded or not offloaded non-seamlessly to a WLAN.

ISMP (Inter-System Mobility Policy): This is a set of rules defined by an operator to have an impact on an inter-system mobility decision made by the UE. When the UE can route IP traffic on a single radio access interface, the UE may use ISMP to select the most appropriate access technology type or access network in a given time.

RAN rule: This is to evaluate an RAN rule programmed in the UE and having radio access network (RAN) assistance parameters received from the network. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. In this case, the UE selects the WLAN and moves all offloadable PDN connections to the WLAN. Alternatively, when the RAN rule for moving the traffic to the 3GPP access is satisfied, the AS layer of the UE delivers a move-traffic-from-WLAN indication to the higher layer of the UE. In this case, the UE moves all PDN connections on the WLAN through 3GPP. 3GPP TS 23.401, TS 23.060, TS 23.402, TS 36.300, TS 36.304, TS 36.331, TS 25.304, and TS 25.331 may be incorporated herein by reference to know detailed descriptions on the RAN rule.

Multi-access PDN connection: This is a PDN connection in which traffic can be routed to the 3GPP access and/or the WLAN access. Each IP flow is routed only to one access at one instance.

<RAN Assistance Parameter>

Recently, apart from the policies provided by the ANDSF, mobile communication service providers are making an effort to define a policy for determining offloading to the WLAN. As part of the effort, a RAN assistance parameter has been proposed recently.

Figure 9A:
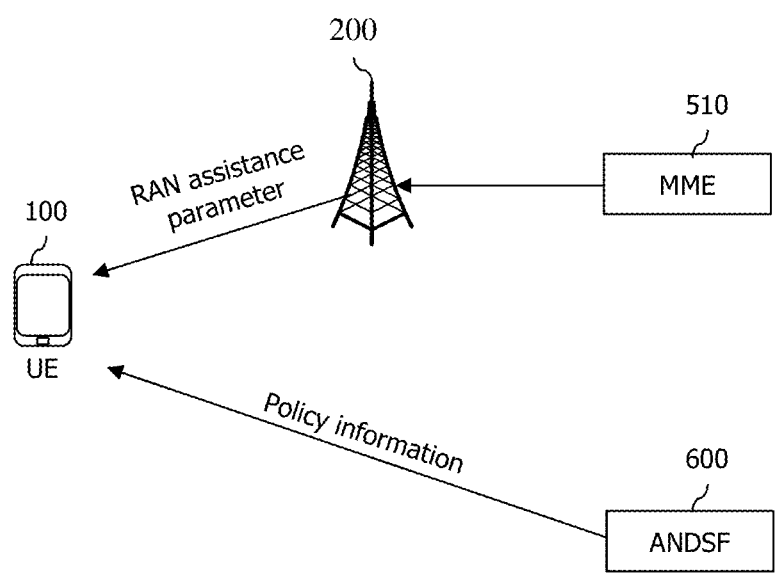
FIG. 9a illustrates an example in which a newly defined RAN assistance parameter (RAN rule) is provided to a UE in addition to an ANDSF policy.

FIG. 9a illustrates an example in which a newly defined RAN assistance parameter (RAN rule) is provided to a UE in addition to an ANDSF policy.

As shown in FIG. 9a, the ANDSF 600 may provide policy information to the UE 100, but the eNB 200 of the E-UTRAN (or UTRAN) may provide a newly defined RAN (Radio Access Network) support parameters to the UE 100.

The RAN assistance parameter may be transmitted through RRC signaling. The RAN assistance parameter may include a threshold for E-UTRAN signal strength and quality, threshold for WLAN channel utilization, threshold for WLAN back hole data transmission rate, list of WLAN identifiers, and OPI (Offload Preference Indicator).

More specifically, the RNA assistance information may include the following threshold and parameters.

3GPP access threshold
WLAN access threshold
OPI (Offload Preference Indication) value The 3GPP access threshold defines part of UTRA and/or E-UTRA radio parameter, for example, low/high RSRP (Reference Signal Received Power) threshold for the E-UTRA, and low/high CPICH (Common Pilot Channel) Ec/No threshold for the UTRA. The WLAN access threshold defines a low/high threshold for part of WLAN access parameters, for example, low/high beacon RSSI threshold, low/high UL/DL backhole data rate threshold, and low/high channel utilization threshold. The hotspot 2.0 defines the UL/DL backhole data rate. The IEEE 802.11 defines the channel utilization and beacon RSSI (Received Signal Strength Indicator).

The OPI value provided by the RAN assumes a bitmap format (namely, one-dimensional bit array) and determines when the UE moves specific traffic (for example, specific IP flow) to WLAN access or 3GPP access.

Referring to the drawing again, the UE may use the RAN assistance parameter for selection of an access network between 3GPP access and WLAN access; and traffic routing.

For the traffic routing, the MME may transmit to the UE the information about which PDN connection may be offloaded to WLAN and which PDN connection may not be offloaded to WLAN. The MME may provide the information for each PDN connection. More specifically, when a PDN connection is formed, the MME may transmit the information.

Meanwhile, in order for a service provider to allow or prevent WLAN offloading for each user or each APN, the subscriber information within an HSS (Home Subscriber Server) may include an indication about whether WLAN offloading is allowed or prevented with respect to a specific PDN.

The MME may determine whether to allow offloading to the WLAN with respect to the UE and PDN connection as described below.

The MME determines offloadability with respect to a PDN connection on the basis of subscriber information and a policy set internally.

When the UE establishes a new PDN connection, the MME may indicate whether the PDN connection may be offloaded to WLAN.

The MME may provide the UE with a update indication of WLAN offloadability with respect to a PDN connection. This operation may be started through the insert subscriber data procedure of the HSS. Also, this operation may be started through a bearer modification procedure.

When performing traffic offloading/handover between 3GPP access and WLAN access, the UE may take into account the WLAN offloadability information provided by the MME.

In case the UE receives a WLAN offloadability indication with respect to a PDN connection, the UE stores the indication while the PDN connection is maintained and performs an update when receiving a new indication.

Meanwhile, an indication about whether a PDN connection may be offloaded is transmitted from a source MME to a target MME during the mobility management procedure. This operation allows the target MME to learn from the indication previously provided to the UE and to provide an updated indication to the UE.

Figure 9B:
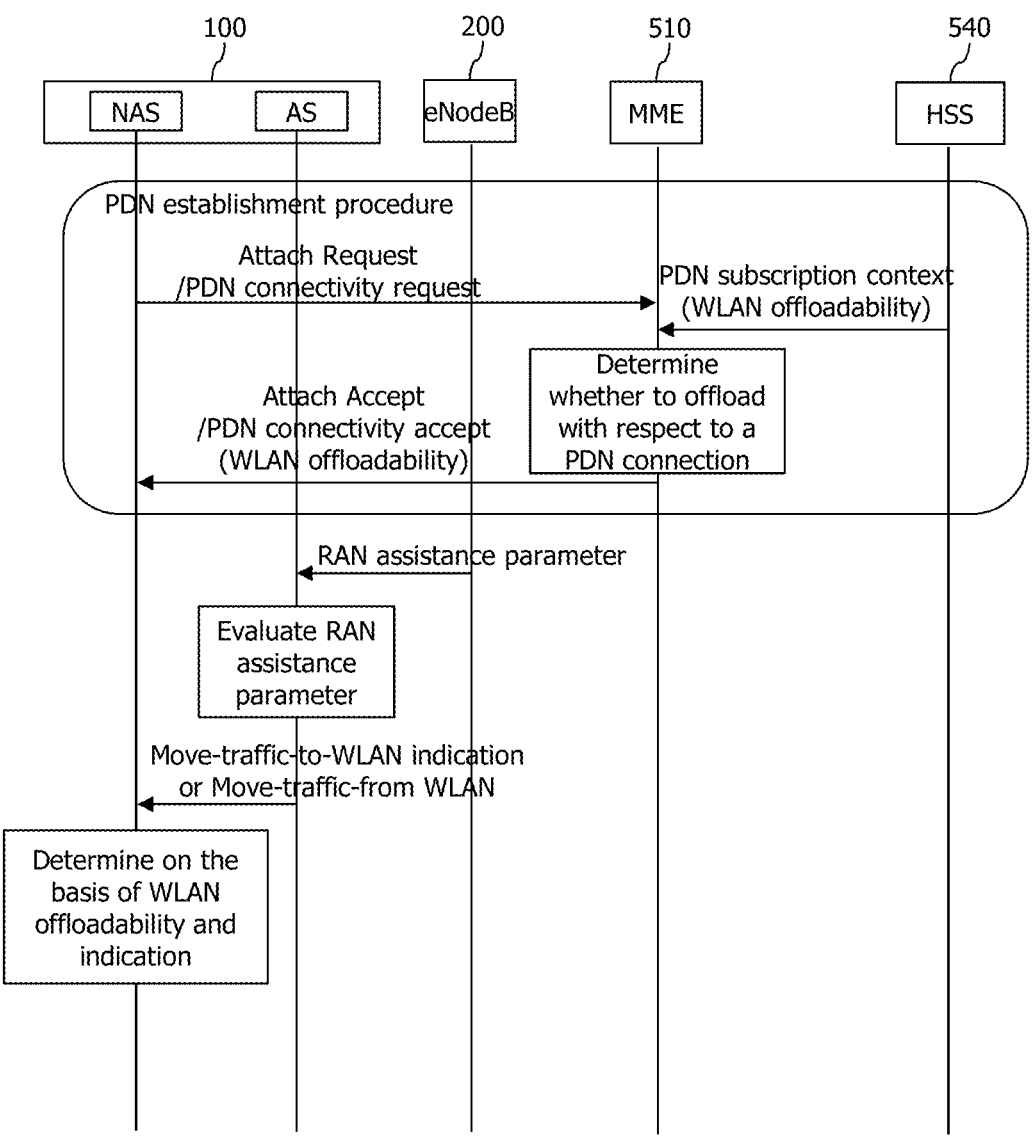
FIG. 9b illustrates a procedure for providing the RAN assistance parameter (RAN rule) shown in FIG. 9a to a UE in more detail.

FIG. 9b illustrates a procedure for providing the RAN assistance parameter (RAN rule) shown in FIG. 9a to a UE in more detail.

As may be known with reference to FIG. 9b, the HSS 540 may transmit WLAN offloadability such as shown in Table 2 to the MME 510. The WLAN offloadability may be transmitted through the PDN subscriber context shown in FIG. 9b, but transmitted to the MME during a position update procedure.

TABLE 2

| WLAN offloadability | Indicates whether the traffic associated with the APN may be offloaded to WLAN or has to be maintained for 3GPP access |
|---|---|

Then the MME 510 determines whether to offload with respect to the PDN connection on the basis of the WLAN offloadability transmitted from the HSS.

And the MME 510 may transmit WLAN offloadability indication to the UE 100 during a PDN connection procedure or modification procedure.

Meanwhile, the eNB 200 may collect information about neighboring WLAN APs and by using the information, transmit the RAN assistance parameter (RAN rule) to the AS layer (namely RRC layer) through the system information block (SIB) or RRC signaling.

The AS layer of the UE (namely RRC layer) evaluates the received RAN assistance parameter (RAN rule) and provides to the upper layer (namely NAS layer) an indication (namely move-traffic-to WLAN indication) indicating offloading to non-3GPP access (for example, WLAN) or an indication (namely move-traffic-from WLAN indication) indicating movement to 3GPP access (for example, E-UTRAN/UTRAN).

Here, the AS layer of the UE provides the upper layer (namely NAS layer) with an indication (namely move-traffic-to WLAN indication) indicating offloading to non-3GPP access (for example, WLAN) when the following two conditions are satisfied during a predetermined period (for example, TsteeringWLAN).

1. Condition for a serving cell of 3GPP access
RSRPmeas<ThreshServingOffloadWLAN, LowP or
RSRQmeas<ThreshServingOffloadWLAN, LowQ;

2. Condition for WLAN
ChannelUtilizationWLAN<ThreshChUtilWLAN, Low; and
BackhaulRateDlWLAN>ThreshBackhRateDLWLAN, High; and
BackhaulRateUlWLAN>ThreshBackhRateULWLAN, High; and
BeaconRSSI>ThreshBeaconRSSIWLAN, High;

Meanwhile, the AS layer of the UE provides the upper layer (namely NAS layer) with an indication (namely move-traffic-from WLAN indication) indicating movement to 3GPP access (for example, E-UTRAN/UTRAN) when the following two conditions are satisfied during a predetermined period (for example, TsteeringWLAN).

1. Condition for WLAN
ChannelUtilizationWLAN>ThreshChUtilWLAN, High; or
BackhaulRateDlWLAN<ThreshBackhRateDLWLAN, Low; or
BackhaulRateUlWLAN<ThreshBackhRateULWLAN, Low; or
BeaconRSSI<ThreshBeaconRSSIWLAN, Low;
Condition for a target cell of 3GPP access
RSRPmeas>ThreshServingOffloadWLAN, HighP; and
RSRQmeas>ThreshServingOffloadWLAN, HighQ;

Returning to the main part again, if the indication (namely move-traffic-to WLAN indication) that the NAS layer of the UE 100 has received from the AS layer indicates offloading to non-3GPP access (for example, WLAN), the NAS layer of the UE 100 offloads only the PDN connection related to the APN indicated by the WLAN offloadability indication to WLAN.

<Problem Scenario of the Present Document>

In the description above, the AS layer of the UE (namely RRC layer) transmits the indication to the NAS layer only when the AS layer of the UE receives the RAN assistance parameter (RAN rule) for the first time and evaluates the RAN assistance parameter or when the evaluation result is different from the previous evaluation result although the RAN assistance parameter (RAN rule) is received additionally.

It should be noted that before the RAN assistance parameter (RAN rule) is received again, the AS layer of the UE (namely RRC layer) does not perform the evaluation and therefore does not transmit the indication to the NAS layer.

It should also be noted that in case the evaluation result is the same as a previous one although the RAN assistance parameter (RAN rule) is additionally received, the AS layer of the UE (namely RRC layer) does not transmit any indication to the NAS layer.

In the two cases above, if the NAS layer of the UE 100 establishes a new PDN connection, since the NAS layer of the UE 100 has not received an indication from the AS layer with respect to the new PDN connection, it is technically unclear whether to perform offloading or whether to use the indication received previously.

In what follows, the problem above will be described with reference to related drawings in more detail.

Figure 10:
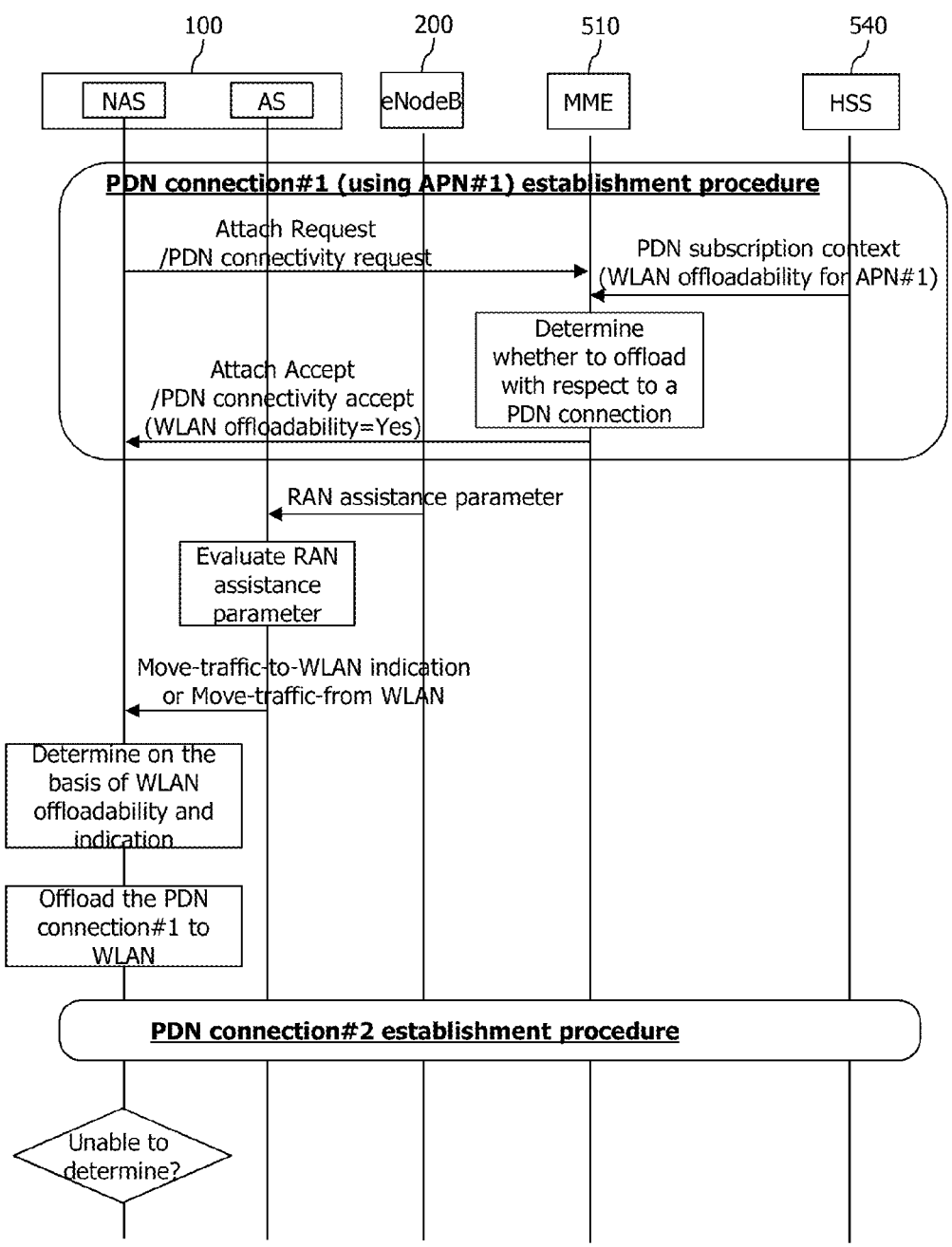
FIG. 10 is a signal flow diagram illustrating a first problem scenario.

FIG. 10 is a signal flow diagram illustrating a first problem scenario.

Referring to FIG. 10, the NAS layer of the UE 100 may transmit a PDN connection request message alone to generate a PDN connection#1 that uses APN#1 or transmits an attach request message that includes the PDN connection request message to the MME 510.

The MME 510 obtains information about WLAN offloadability with respect to the APN#1 of the UE from the HSS 540 that has subscriber information of the UE.

Next, the MME 510 determines whether to perform offloading with respect to the PDN connection#1 that uses the APN#1 by using the information obtained from the HSS.

And the MME 510 transmits a PDN connection accept message that includes the WLAN offloadability indication indicating the determination result to the UE or transmits an attach accept message that includes the PDN connection accept message to the UE.

Meanwhile, the eNB 200 may collect information related to neighboring WLAN APs and accordingly transmit the RAN assistance parameter (RAN rule) to the AS layer of the UE 100 (namely RRC layer) through a system information block (SIB) or RRC signaling.

The AS layer of the UE (namely RRC layer) evaluates the received RAN assistance parameter (RAN rule) at an arbitrary time point and provides to the NAS layer an indication (namely move-traffic-to WLAN indication) indicating offloading to non-3GPP access (for example, WLAN) or an indication (namely move-traffic-from WLAN indication) indicating movement to 3GPP access (for example, E-UTRAN/UTRAN).

The NAS layer of the UE determines whether to offload the PDN connection#1 that uses the APN#1 to WLAN by using the WLAN offloadability indication included in the PDN connection accept message received from the MME 510 and the indication obtained from the AS layer.

FIG. 10 illustrates a case in which the PDN connection#1 that uses the APN#1 is offloaded to WLAN.

Meanwhile, the NAS layer of the UE 100 transmits a PDN connection request message to establish a PDN connection#2 that uses the APN#1.

And the NAS layer of the UE 100 receives a PDN connection accept message. Here, the PDN connection accept message includes a WLAN offloadability indication about the PDN connection#2 that uses the APN#1.

However, since the NAS layer of the UE 100 has failed to receive an indication from the AS layer required to determine offloading, the NAS layer waits until it receives an indication. However, as described above, before the RAN assistance parameter (RAN rule) is received again, the AS layer of the UE does not perform the evaluation and thus does not transmit the indication to the NAS layer. Similarly, in case the evaluation result is the same as a previous one although the RAN assistance parameter (RAN rule) is additionally received, the AS layer of the UE does not transmit the indication to the NAS layer.

Therefore, the NAS layer of the UE 100 is unable to determine offloading with respect to the PDN connection#2 that uses the APN#1 and continues to wait. Moreover, since the NAS layer of the UE 100 does not know whether an indication previously received from the AS layer may be used again, the NAS layer continues the waiting.

Figure 11:
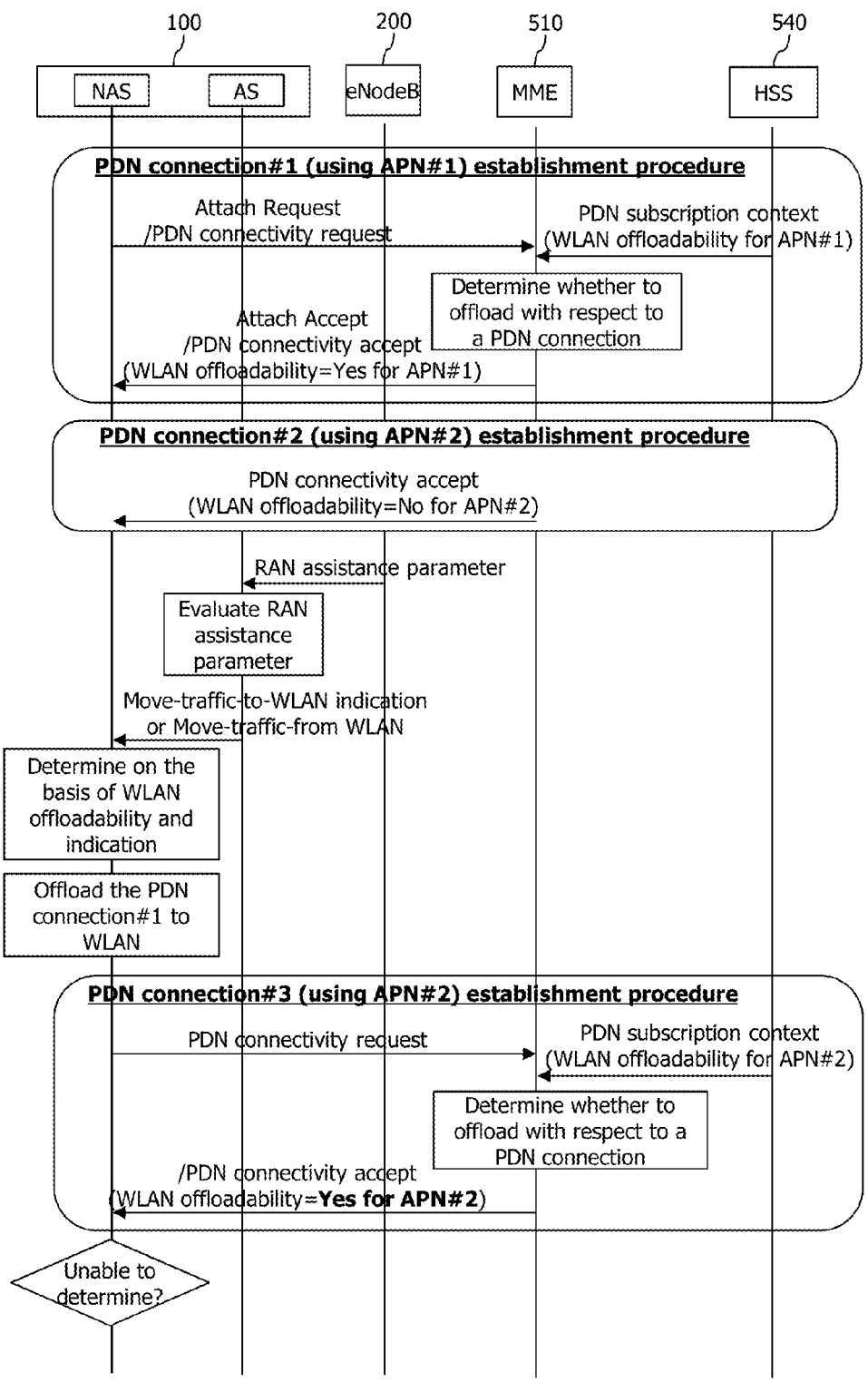
FIG. 11 is a signal flow diagram illustrating a second problem scenario.

FIG. 11 is a signal flow diagram illustrating a second problem scenario.

Referring to FIG. 11, the NAS layer of the UE 100 may transmit a PDN connection request message alone to generate a PDN connection#1 that uses APN#1 or transmits an attach request message that includes the PDN connection request message to the MME 510.

The MME 510 obtains information about WLAN offloadability with respect to the APN#1 of the UE from the HSS 540 that has subscriber information of the UE.

Next, the MME 510 determines whether to perform offloading with respect to the PDN connection#1 that uses the APN#1 by using the information obtained from the HSS.

And the MME 510 transmits a PDN connection accept message including a WLAN offloadability indication (for example, WLAN offloadability=Yes for APN#1) representing the determination result to the UE or transmits an attach accept message including the PDN connection accept message to the UE.

The NAS layer of the UE 100 performs a PDN connection request procedure to generate a PDN connection#2 that uses an APN#2 and accordingly receives a PDN connection accept message from the MME 510. The PDN connection accept message includes an indication indicating that offloading to WLAN for the APN#2 is not possible (for example, WLAN_offloadability=NO for APN #2).

Meanwhile, the eNB 200 may collect information related to neighboring WLAN APs and accordingly transmit the RAN assistance parameter (RAN rule) to the AS layer of the UE 100 (namely RRC layer) through a system information block (SIB) or RRC signaling.

The AS layer of the UE (namely RRC layer) evaluates the received RAN assistance parameter (RAN rule) at an arbitrary time point and provides to the NAS layer an indication (namely move-traffic-to WLAN indication) indicating offloading to non-3GPP access (for example, WLAN) or an indication (namely move-traffic-from WLAN indication) indicating movement to 3GPP access (for example, E-UTRAN/UTRAN).

The NAS layer of the UE determines to offload the PDN connection#1 that uses the APN#1 and the PDN connection#2 that uses the APN#2 according to the WLAN offloadability indication included in the two PDN connection accept message received from the MME 510 and the indication obtained from the AS layer.

FIG. 11 illustrates a case in which since a PDN connection accept message for the PDN connection#1 includes an indication (for example, WLAN offloadability=Yes for APN#1) indicating that offloading to WLAN for the APN#1 is possible while the PDN connection accept message for the PDN connection#2 includes an indication (for example, WLAN offloadability=NO for APN#2) indicating that offloading to WLAN for the APN#2 is impossible, only the PDN connection#1 that uses the APN#1 is offloaded to WLAN.

Meanwhile, the NAS layer of the UE 100 performs a PDN connection request procedure to establish a PDN connection#3 that uses the APN#2 and accordingly receives a PDN connection accept message from the MME 510. The PDN connection accept message includes an indication (for example, WLAN offloadability=Yes for APN#2) indicating that offloading to WLAN for the APN#2 is possible.

Then since offloading for the APN#2 has been made possible, the NAS layer of the UE 100 determines whether to actually perform offloading.

However, since the NAS layer of the UE 100 has not received an indication from the AS layer needed for determining whether to perform offloading for the PDN connection#3 that uses the APN#2, the NAS layer has to wait until the indication is received. However, as described earlier, before the RAN assistance parameter (RAN rule) is received again, the AS layer of the UE does not perform the evaluation and thus does not transmit the indication to the NAS layer. Similarly, in case the evaluation result is the same as a previous one although the RAN assistance parameter (RAN rule) is additionally received, the AS layer of the UE does not transmit any indication to the NAS layer.

Therefore, the NAS layer of the UE is unable to determine offloading with respect to the PDN connection#3 that uses the APN#2 and continues to wait. Moreover, since the NAS layer of the UE 100 does not know whether an indication previously received from the AS layer may be used again, the NAS layer continues the waiting.

DISCLOSURE OF THE PRESENT INVENTION

Therefore, the present invention proposes a method for offloading a PDN connection efficiently for the aforementioned problem scenarios.

More specifically, to solve the problem above, the present invention proposes a method for requesting the AS layer (namely RRC layer) to evaluate the RAN assistance parameter and to inform of the evaluation result when the NAS layer of the UE 100 performs a PDN connection request procedure (namely when the UE 100 transmits a PDN connection request message) or when the UE completes the PDN connection request procedure (namely when the UE receives a PDN connection accept message).

Also, to solve the problem, the present invention proposes a method for requesting the AS layer of the UE 100 to activate a timer, to evaluate the RAN assistance parameter each time the timer expires, and to inform of the evaluation result.

According to the present invention, each time a request is received from the NAS layer or a proposed timer expires, the AS layer of the UE 100 evaluates the RAN assistance parameter and transmits the evaluation result to the NAS layer.

Also, to solve the problem, the present invention proposes a method by which the AS layer of the UE 100 evaluates the RAN assistance parameter and transmits the evaluation result to the NAS layer even if the evaluation result is not different from a previous result.

Also, to solve the problem, the present invention provides a method for transmitting an indication commanding to retain current access (for example, retain-to-the current access) to the NAS layer in case 3GPP access or non-3GPP access is not selected although the AS layer of the UE (namely RRC layer) evaluates the RAN assistance parameter.

The proposed methods may be used separately or in combination with each other.

Figure 12:
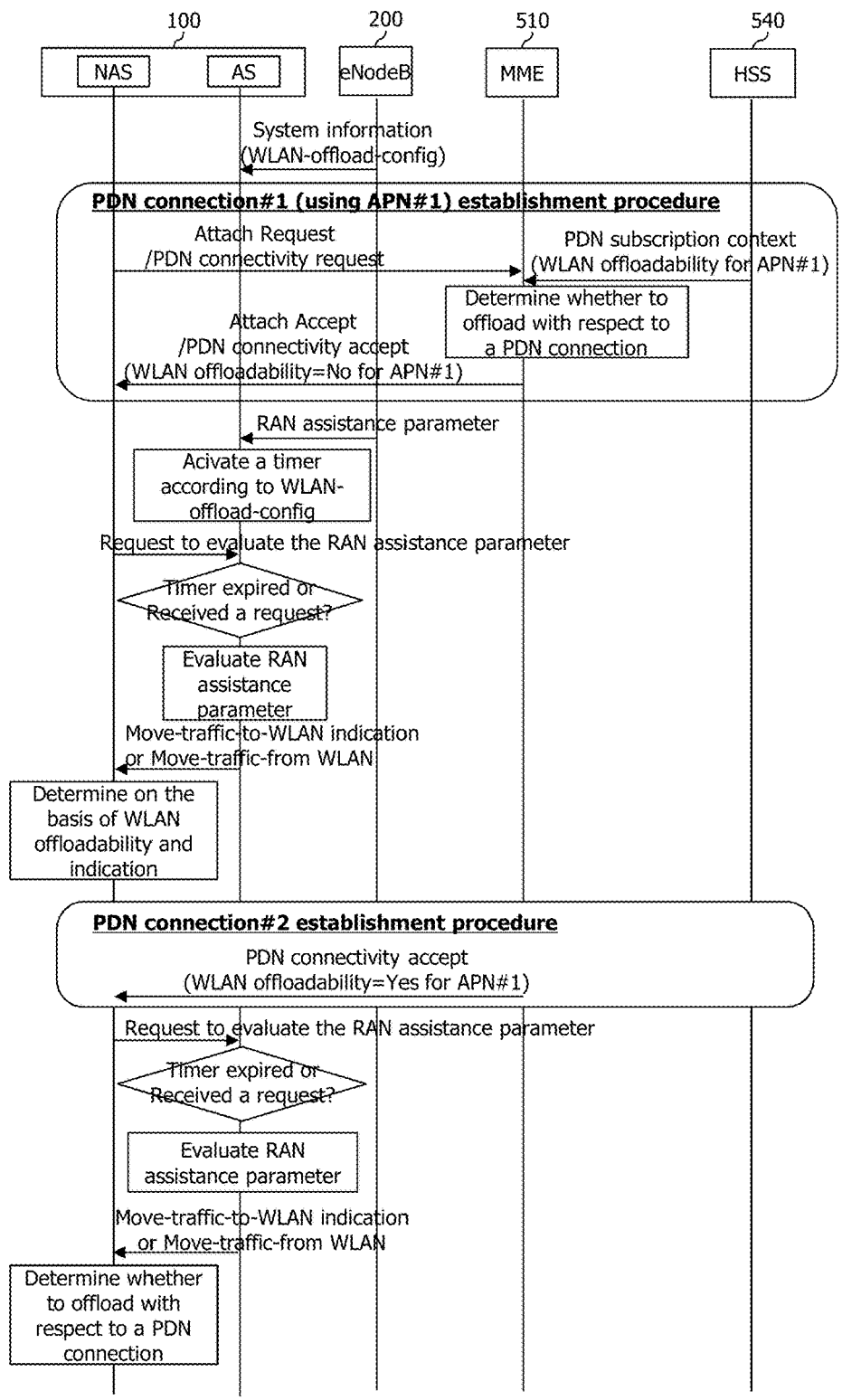
FIG. 12 is a flow diagram illustrating a method according to one disclosure of the present document.

FIG. 12 is a flow diagram illustrating a method according to one disclosure of the present document.

Referring to FIG. 12, the eNB 200 transmits configuration information about offloading to WLAN (for example, WLAN-offload-config) to the AS layer of the UE 100 through a SIB (System Information Block). The configuration information about offloading to WLAN (for example, WLAN-offload-config) may include configuration information about the timer proposed by the present invention. Also, the configuration information may further include the RAN assistance parameter. Configuration information about the proposed timer will be described later.

The NAS layer of the UE 100 transmits alone a PDN connection request message to generate a PDN connection#1 that uses the APN#1 or transmits an attach request message including the PDN connection request message to the MME 510.

The MME 510 obtains information about WLAN offloadability for the APN#1 of the UE from the HSS 540 having subscriber information of the UE.

Next, the MME 510 determines offloading for the PDN connection#1 that uses the APN#1 by using the information obtained from the HSS.

And the MME 510 transmits a PDN connection accept message including a WLAN offloadability indication indicating the determination result to the UE 100 or transmits an attach accept message including the PDN connection accept message to the UE.

FIG. 12 illustrates an example in which a PDN connection accept message for the PDN connection#1 includes an indication (for example, WLAN offloadability=No for APN#1) indicating that offloading to WLAN is impossible for APN#1.

Meanwhile, the eNB 200 may collect information about neighboring WLAN APs and by using the information, transmit the RAN assistance parameter (RAN rule) to the AS layer (namely RRC layer) through the system information block (SIB) or RRC signaling.

Also, the AS layer (RRC layer) of the UE 100 activates a timer according to the configuration information about the timer obtained above.

The NAS layer of the UE 100 requests the AS layer to evaluate the RAN assistance parameter and to transmit the evaluation result according to the present invention.

If a request is received from the NAS layer or the timer expires, the AS layer (RRC layer) of the UE 100 evaluates the RAN assistance parameter and according to the evaluation result, transmits to the NAS layer either of an indication indicating offloading to non-3GPP access (for example, WLAN) (namely move-traffic-to WLAN indication) and an indication indicating movement to 3GPP access (for example, E-UTRAN/UTRAN) (namely move-traffic-from WLAN indication). FIG. 12 illustrates an example in which an indication indicating offloading to non-3GPP access (for example, WLAN) (namely move-traffic-to WLAN indication) is transmitted.

The NAS layer of the UE 100 determines whether to offload the PDN connection#1 that uses the APN#1 to WLAN by using the WLAN offloadability indication included in the PDN connection accept message received from the MME 510 and the indication obtained from the AS layer.

Here, although the NAS layer receives an indication indicating movement to non-3GPP access (for example, WLAN) (namely move-traffic-to WLAN indication) from the AS layer, since the PDN connection accept message for the PDN connection#1 includes an indication indicating that offloading to WLAN for APN#1 is impossible (for example, WLAN offloadability=No for APN#1), the NAS layer determines not to offload the PDN connection#1 that uses the APN#1 to WLAN.

Meanwhile, the NAS layer of the UE 100 transmits a PDN connection request message to establish a PDN connection#2 that uses the APN#1.

And the NAS layer of the UE 100 receives a PDN connection accept message for the PDN connection#2 that uses the APN#1. Here, the PDN connection accept message includes an indication indicating that offloading to WLAN for the APN#1 (for example, WLAN offloadability=Yes for APn#1) has been changed to be possible.

The NAS layer of the UE 100 requests the AS layer to evaluate the RAN assistance parameter and to transmit the evaluation result according to the present invention.

If a request is received from the NAS layer or the timer expires, the AS layer (RRC layer) of the UE 100 evaluates the RAN assistance parameter and transmits the evaluation result to the NAS layer. At this time, even if the evaluation result is the same as a previous evaluation result, according to the present invention, the AS layer (RRC layer) of the UE 100 provides the evaluation result to the NAS layer or provides the NAS layer with an indication informing that the evaluation result is the same as a previous one. FIG. 12 illustrates an example in which an indication indicating offloading to non-3GPP access (for example, WLAN) (namely move-traffic-to WLAN indication) is transmitted again.

The NAS layer of the UE 100 determines whether to offload the PDN connection#2 that uses the APN#1 to WLAN by using the WLAN offloadability indication included in the PDN connection accept message received with respect to the PDN connection#2 and the indication obtained from the AS layer.

Here, since the PDN connection accept message with respect to the PDN connection#2 includes an indication (for example, WLAN offloadability=Yes for APN#1) indicating that offloading to WLAN for the APN#1 is possible, and an indication (namely move-traffic-to WLAN indication) indicating offloading to non-3GPP access (for example, WLAN) is received from the AS layer, the NAS layer determines to offload the PDN connection#2 that uses the APN#1 to WLAN. Here, according to an indication (for example, WLAN offloadability=Yes for APN#1) indicating change of offloading to WLAN for the APN#1 from being impossible to being possible, the existing PDN connection#1 that uses the APN#1 may be determined to be offloaded to WLAN.

Meanwhile, different from the illustration of FIG. 12, if neither of an indication (namely move-traffic-to WLAN indication) indicating offloading to non-3GPP access (for example, WLAN) and an indication (namely move-traffic-from WLAN indication) indicating movement to 3GPP access (for example, E-UTRAN/UTRAN) is selected according to the evaluation result of the RAN assistance parameter by the AS layer (RRC layer) of the UE 100, the AS layer (RRC layer) of the UE 100 may transmit an indication commanding the AS layer (RRC layer) of the UE 100 to retain current access (for example, retain-to-the current access) to the NAS layer. In this case, the NAS layer determines not to offload the PDN connection#2 that uses the APN#1 to WLAN but maintain the PDN connection#2 to 3GPP access.

Figure 13:
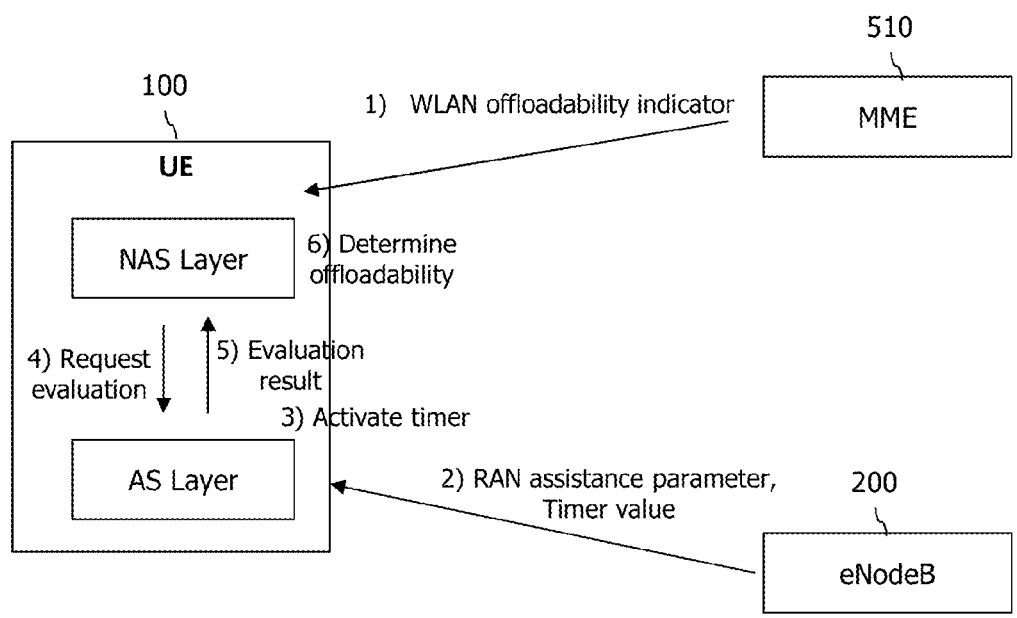
FIG. 13 is a flow diagram illustrating a method according to one disclosure of the present document.

FIG. 13 is a flow diagram illustrating a method according to one disclosure of the present document.

Referring to FIG. 13, the NAS layer of the UE 100 receives a WLAN offloadability indicator from the MME 510. Also, the AS layer of the UE 100 receives a RAN assistance parameter and timer value from the eNB. The AS layer of the UE 100 activates the timer according to the timer value.

The NAS layer of the UE 100 requests the AS layer to perform evaluation.

The AS layer of the UE 100 evaluates the RAN assistance parameter according to the request of the NAS layer and transmits a move-traffic-to WLAN indicator or move-traffic-from WLAN indication to the NAS layer according to the evaluation result.

The NAS layer determines whether to offload a PDN connection to WLAN on the basis of the WLAN offloadability indicator obtained from the MME 510 and the indication received from the AS layer.

In the description above, the present invention has been based on the following operating concept. In other words, when the NAS layer of the UE 100 receives a response message with respect to a PDN connection request procedure from the MME (or SGSN), and the response message includes a WLAN offloadability indicator, the NAS layer of the UE 100 requests the AS layer to determine whether to offload to WLAN according to the AS layer's evaluation of the RAN assistance parameter. However, this concept may be further extended that if the response message includes a WLAN offloadability indicator even when the NAS layer of the UE 100 receives from the MME (or SGSN) an Activate Dedicated EPS Bearer Context Request message, Activate Default EPS Bearer Context Request message, Deactivate EPS Bearer Context Request message, and Modify EPS Bearer Context Request message, the NAS layer of the UE 100 may request the AS layer to determine whether to offload to WLAN according to the evaluation result of the RAN assistance parameter. Similarly, in case the WLAN offloadability indication (namely, WLAN offloadability acceptability) is included in the NAS message each time the Attach/PDN connectivity Request/EPS bearer context modification procedure is performed, the NAS layer may request the AS layer to evaluate the WLAN offloadability.

The description above may be described more specifically as follows.

First, if the UE receives an ACTIVATE DEFAULT EPS BEARER CONTEXT REQUEST message, and the timer for an APN indicated by the message (for example, T3396 timer) is operating, the UE stops the timer and transmits an ACTIVATE DEFAULT EPS BEARER CONTEXT ACCEPT message. If a WLAN offloadability indication is included in the ACTIVATE DEFAULT EPS BEARER CONTEXT REQUEST message, the UE stores the value of the WLAN offloadability indication for the PDN connection to use in a later determination. And the NAS layer of the UE requests a lower layer, for example, AS layer (namely RRC layer) to determine WLAN offloadability (namely requests to determine RAN assistance parameter).

Next, if the UE receives a MODIFY EPS BEARER CONTEXT REQUEST message, and the timer for an APN indicated by the message (for example, T3396 timer), the UE stops the timer and transmits a MODIFY EPS BEARER CONTEXT ACCEPT message. If a WLAN offloadability indication is included in the MODIFY EPS BEARER CONTEXT REQUEST message, the UE stores the value of the WLAN offloadability indication for the PDN connection to use in a later determination. And the NAS layer of the UE requests a lower layer, for example, AS layer (namely RRC layer) to determine WLAN offloadability (namely requests to determine RAN assistance parameter).

On the other hand, if the NAS layer of the UE 100 requests the AS layer to perform evaluation, the request may be transmitted through the following message.

The message may be a WLAN Offloadability Evaluation Request message. The message is transmitted to request the AS layer to perform evaluation of WLAN offloadability for a specific APN (namely evaluation of RAN assistance parameter).

The following table illustrates the structure of the WLAN Offloadability Evaluation Request message.

TABLE 3

| Information element |
| --- |
| Protocol identifier |
| Security header type |
| WLAN Offloadability Evaluation Request message identifier |
| APN (Access point name) |

Meanwhile, the AS layer of the UE 100 evaluates the RAN assistance parameter periodically according to the timer or a request of the NAS layer and transmits the indication according to the evaluation result, namely move-traffic-to-WLAN indication or move-traffic-from-WLAN indication to the NAS layer. In case the NAS layer of the UE receives the move-traffic-to-WLAN indication from the AS layer, and the indication obtained from the MME 510 indicates that the corresponding PDN connection for the APN#1 may be offloaded, the NAS layer of the UE 100 offloads the corresponding PDN connection to WLAN. At this time, the NAS layer of the UE may also offload other existing PDN connection to WLAN in the same manner. Also, in case the NAS layer of the UE 100 receives a move-traffic-from-WLAN indication for a PDN connection with respect to the APN#2 from the AS layer, the NAS layer of the UE 100 moves the PDN connection for the APN#2 from WLAN to E-UTRAN. At this time, the NAS layer also moves the other existing PDN connection connected through the APN#2.

On the other hand, a process for transmitting an indication according to an evaluation result to the NAS layer after the AS layer of the UE 100 evaluates the RAN assistance parameter will be described in detail below.

1) The AS layer of the UE 100 transmits the move-traffic-to-WLAN indication together with a list of WLAN identifiers. Entries within the list include SSID, BSSID, and HESSID.

2) The move-traffic-from-WLAN indication is transmitted alone.

However, even if the AS layer transmits any one of indications according to the evaluation, user preference may be considered with a higher priority than the indication from the AS layer in the following case.

The case in which the NAS layer receives a list of move-traffic-to-WLAN identifiers, but the user preference has been already determined The case in which a new PDN connection is to be established through 3GPP access.

And the UE may select NAI for authentication with WLAN.

To summarize, in case the NAS layer of the UE receives a move-traffic-from-WLAN indication from the AS layer, but the user preference has not been set up yet, the UE may move all of PDN connections going through non-3GPP access (namely WLAN access) to 3GPP access.

On the other hand, the AS layer of the UE (namely, RRC layer) may evaluate the RAN assistance parameter according to the period of the timer. The timer is an evaluation check timer and may correspond to T380 (or T3xx), for example. Configuration information for the timer is received from a network (eNB) by being included in the WLAN-OffloadConfig parameter (for example, wlan-OffloadConfigCommon parameter or wlan-OffloadConfigDedicated parameter) of an RRC Connection Reconfiguration message when the UE is in the RRC connected mode. In case the UE is in the RRC IDLE mode, the configuration information is received from the network (eNB) by being included in the system information block, for example, WLAN-OffloadConfig parameter of SIB17. Therefore, if the configuration information of the timer is received, the AS layer of the UE 100 activates the timer according to the configuration information.

The operation above will be described in more detail below.

If the UE 100 obtains a WLAN-OffloadConfig parameter, the UE checks whether the value of the evaluation check timer, T380 timer, or T3xx timer is included in the parameter. And if it is found that the parameter includes the value, the UE activates the timer. If the timer expires, the UE performs network selection within the RAN assistance parameter and evaluation of a traffic adjustment rule and transmits the evaluation result to the upper layer.

Meanwhile, if T380 or T3xx timer is operating and WLAN-OffloadConfig parameter has been obtained, the UE 100 selects/reselects a different cell other than Pcell. And the UE stops the T380 or T3xx timer.

On the other hand, the RRC Connection Reconfiguration message may include the WLAN-OffloadConfig as follows.

TABLE 4

```
RRCConnectionReconfiguration-v1250-IEs ::= SEQUENCE {
    wlan-OffloadInfo-r12            CHOICE {
        release                     NULL,
        setup                       SEQUENCE {
    wlan-OffloadConfigDedicated-r12 WLAN-OffloadConfig-r12,
```

Also, the system information block, for example, SIB type 17 may include WLAN-OffloadConfig as shown below.

TABLE 5

```
-- ASN1START
WLAN-OffloadInfoPerPLMN-r12 ::=     SEQUENCE {
    wlan-OffloadConfigCommon-r12    WLAN-OffloadConfig-r12   OPTIONAL, -- Need OR
    wlan-Id-List-r12                WLAN-Id-List-r12         OPTIONAL, -- Need OR
    ...
```

The WLAN-OffloadConfig may include the following information.

TABLE 6

| Description of WLAN-OffloadConfig field |
|---|
| offloadPreferenceIndicator |
| Offloading preference indicator. It is used for RAN supported WLAN interworking based on ANDSF rule. |
| thresholdBackhaulDLBandwidth-High |
| Upper threshold for downlink bandwidth used by the UE for adjusting traffic to WLAN |
| thresholdBackhaulDLBandwidth-Low |

TABLE 6-continued

| Description of WLAN-OffloadConfig field |
|---|
| Lower threshold for downlink bandwidth used by the UE for adjusting traffic to E-UTRAN |
| thresholdBackhaulULBandwidth-High |
| Upper threshold for uplink bandwidth used by the UE for adjusting traffic to WLAN |
| thresholdBackhaulULBandwidth-Low |
| Lower threshold for uplink bandwidth used by the UE for adjusting traffic to E-UTRAN |
| thresholdBeaconRSSI-High |
| Upper threshold for beacon RSSI used by the UE for adjusting traffic to WLAN |
| thresholdBeaconRSSI-Low |
| Lower threshold for beacon RSSI used by the UE for adjusting traffic to E-UTRAN |
| thresholdChannelUtilization-High |
| WLAN channel upper utilization (load) used by the UE for adjusting traffic to E-UTRAN |
| thresholdChannelUtilization-Low |
| WLAN channel lower utilization (load) used by the UE for adjusting traffic to E-UTRAN |
| thresholdRSRP-High |
| RSRP upper threshold used by the UE for adjusting traffic to E-UTRAN |
| thresholdRSRP-Low |

TABLE 6-continued

| Description of WLAN-OffloadConfig field |
|---|
| RSRP lower threshold used by the UE for adjusting traffic to E-UTRAN |
| t-SteeringWLAN |
| Timer value indicating a time interval for which a rule has to be satisfied before traffic adjustment between WLAN and the E-UTRAN is started |
| T380 (or T3xx) |
| Value for T380 timer or T3xx timer, which may be expressed in minutes. |

The start and stop condition for the T380 timer or T3xx timer are as follows.

TABLE 7

| Timer | Start condition | Stop condition | Operation upon expiration of timer |
|---|---|---|---|
| T380 (T3xx) | When T380 timer value or T3xx timer value is received by being included in WLAN-OffloadInfo, evaluation is triggered, and move-traffic-to-WLAN indication or move-traffic-from-WLAN indication is transmitted to the upper layer | When an evaluation request is received from the upper layer or cell reselection is performed | Evaluate the RAN assistance parameter and transmit the evaluation result to the NAS layer |

The embodiments of the present invention described above may be implemented by hardware. Hardware implementation of the present invention will be described with reference to FIG. 14.

Figure 14:
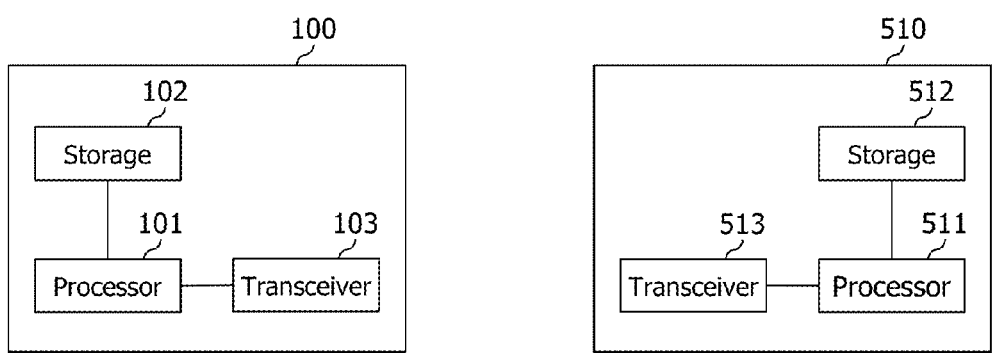
FIG. 14 is a block diagram illustrating a UE 100 and an MME 510 according to an embodiment of the present invention.

FIG. 14 is a block diagram illustrating a UE 100 and an MME 510 according to an embodiment of the present invention.

As shown in FIG. 14, the UE 100 comprises a storage means 101, controller 102, and transceiver 103. And the MME 510 comprises a storage means 511, controller 512, and transceiver 513.

The storage means 101, 511 store the methods described above.

The controllers 102, 512 control the storage means 101, 511 and the transceivers 103, 513. More specifically, the controllers 102, 512 execute the methods stored in the storage means 101, 511, respectively. And the controllers 102, 512 transmit the signals described above through the transceivers 103, 513.

In this document, preferred embodiments of the present invention have been described, but the technical scope of the present invention is not limited only to the specific embodiments. Therefore, the present invention may be modified, changed, or updated in various ways within the technical principles and scope defined by the appended claims.

What is claimed is:

1. A method for performing network selection and traffic routing, the method performed by a user equipment (UE), which includes an access stratum (AS) layer and a non-access stratum (NAS) layer, the method comprising:
    receiving radio access network (RAN) assistance information from an eNB,
    wherein the RAN assistance information includes a RAN assistance parameter and timer values, which include a first timer value and a second timer value;
    receiving an evaluation request from the NAS layer,
    wherein the evaluation request is transmitted by the NAS layer, when an accept message for a packet data network (PDN) connection is received by the NAS layer;
    evaluating the RAN assistance parameter during a time interval related to the first timer value, based on the evaluation request from the NAS layer;
    transmitting offloading information related to off loading of the PDN connection to the NAS layer based on the evaluation of the RAN assistance parameter,
    wherein the off loading information is selected based on the evaluation of the RAN assistance parameter among first information related with offloading the PDN connection to a wireless local area network (WLAN) access, second information related with offloading the PDN connection to 3GPP access, and third information related with maintaining current access of the PDN connection;
    activating a timer based on the second timer value, when the off loading information is transmitted by the AS layer; and
    when the timer expires, returning to the evaluating of the RAN assistance parameter.

2. The method of claim 1, wherein the RAN assistance information is expressed by WLAN-OffloadConfig and is received through a System Information Block (SIB) or Radio Resource Control (RRC) message.

3. The method of claim 1, wherein the RAN assistance parameter includes one or more of a 3GPP access threshold value, WLAN access threshold value, and offload preference indication (OPI) value.

4. The method of claim 1, further comprising:
    stopping the timer when the evaluation request is received from the NAS layer after the timer is activated; and
    reactivating the timer, when the offloading information is transmitted to the NAS layer based on the evaluation of the RAN assistance parameter.

5. The method of claim 1, further comprising:
    transmitting the same offloading information with previously transmitted off loading information or the third information to the NAS layer, when the evaluation of the RAN assistance parameter, which is performed again by the returning, is same as a previously performed evaluation of the RAN assistance parameter.

6. The method of claim 1, wherein the receiving the evaluation request from the NAS layer comprises:
    receiving the accept message including WLAN offloadability information informing that the PDN connection is offloadable to the WLAN access from a mobility management entity (MME); and
    transmitting the evaluation request to the AS layer, when the WLAN offloadability information is included in the accept message.

7. A user equipment (UE) for performing network selection and traffic routing, the UE comprising:
    a transceiver; and
    a processor operatively connected to the transceiver, wherein the processor includes an AS (Access Stratum) layer and an NAS (Non-Access Stratum) layer
    wherein the AS layer is configured to:
    receive a radio access network (RAN) assistance information from an eNB, wherein the RAN assistance information includes a RAN assistance parameter and timer values, which include a first timer value and a second timer value;
    receive an evaluation request from the NAS layer,
    wherein the evaluation request is transmitted by the NAS layer, when an accept message for a packet data network (PDN) connection is received by the NAS layer;
    evaluate the RAN assistance parameter during a time interval related to the first timer value, based on the evaluation request from the NAS layer;
    transmit off loading information related to offloading of the PDN connection to the NAS layer based on the evaluation of the RAN assistance parameter,
    wherein the off loading information is selected based on the evaluation of the RAN assistance parameter among a first information related with offloading the PDN connection to a wireless local area network (WLAN) access, second information related with offloading the PDN connection to 3GPP access, and third information related with maintaining current access of the PDN connection; activate a timer based on the second timer value, when the offloading information is transmitted by the AS layer; and
    when the timer expires, returning to the evaluating of the RAN assistance parameter.

8. The UE of claim 7, wherein the RAN assistance information is expressed by WLAN-OffloadConfig and is received through a System Information Block (SIB) or Radio Resource Control (RRC) message.

9. The UE of claim 7, wherein the RAN assistance parameter includes one or more of a 3GPP access threshold value, WLAN access threshold value, and an Offload Preference Indication (OPI) value.

10. The UE of claim 7, wherein the AS layer is further configured to: stop the timer, when the evaluation request is received from the NAS layer after the timer is activated; and reactivate the timer, when the off loading information is by the AS layer based on the evaluation of the RAN assistance parameter.

11. The UE of claim 7, wherein the AS layer is further configured to: transmit same offloading information with previously transmitted off loading information or the third information to the NAS layer, when the evaluation of the RAN assistance parameter, which is performed again by the returning, is same as a previously performed evaluation of the RAN assistance parameter.

12. The UE of claim 7, wherein the NAS layer is configured to:

receive the accept message including WLAN offloadability information informing that the PDN connection is offloadable to the WLAN access from a mobility management entity (MME); and transmit the evaluation request to the AS layer, when the WLAN offloadability information is included in the accept message.

13. The method of claim 6, further comprising, determining whether to perform the off loading of the PDN connection based on the WLAN offloadability information and the offloading information.

14. The UE of claim 12, wherein the NAS layer is configured to: determine whether to perform the off loading of the PDN connection based on the WLAN offloadability information and the offloading information.

* * * * *